(12) United States Patent
Morin et al.

(10) Patent No.: US 11,679,348 B2
(45) Date of Patent: Jun. 20, 2023

(54) HORIZONTAL SAND SEPARATOR ASSEMBLY

(71) Applicant: ENERCORP SAND SOLUTIONS INC., Calgary (CA)

(72) Inventors: Justin Morin, Calgary (CA); Rory Nagge, Calgary (CA)

(73) Assignee: ENERCORP ENGINEERED SOLUTIONS INC., Calgary (CA)

( * ) Notice: Subject to any disclaimer, the term of this patent is extended or adjusted under 35 U.S.C. 154(b) by 633 days.

(21) Appl. No.: 15/858,635

(22) Filed: Dec. 29, 2017

(65) Prior Publication Data

US 2019/0201817 A1 Jul. 4, 2019

(51) Int. Cl.
| | | |
|---|---|---|
| *B01D 29/52* | (2006.01) | |
| *E21B 43/34* | (2006.01) | |
| *B01D 29/96* | (2006.01) | |
| *B01D 29/01* | (2006.01) | |
| *B01D 35/027* | (2006.01) | |
| *B01D 29/64* | (2006.01) | |
| *B01D 29/60* | (2006.01) | |
| *B01D 35/12* | (2006.01) | |
| *E21B 43/26* | (2006.01) | |

(52) U.S. Cl.
CPC ............. *B01D 29/52* (2013.01); *B01D 29/01* (2013.01); *B01D 29/60* (2013.01); *B01D 29/6469* (2013.01); *B01D 29/96* (2013.01); *B01D 35/0273* (2013.01); *B01D 35/12* (2013.01); *E21B 43/34* (2013.01); *B01D 2201/16* (2013.01); *B01D 2201/24* (2013.01); *E21B 43/26* (2013.01)

(58) Field of Classification Search
None
See application file for complete search history.

(56) References Cited

U.S. PATENT DOCUMENTS

| | | | | |
|---|---|---|---|---|
| 1,150,086 A | * | 8/1915 | Willmstyn | B01D 35/12 210/333.1 |
| 1,152,831 A | * | 9/1915 | Monteagle | F16L 55/24 210/443 |
| 1,431,006 A | * | 10/1922 | Kelsey | F04B 47/005 166/105.3 |
| 1,439,280 A | * | 12/1922 | Westmoreland | F04B 47/005 166/105.3 |

(Continued)

*Primary Examiner* — Robert J Popovics
(74) *Attorney, Agent, or Firm* — MH2 Technology Law Group LLP (57) ABSTRACT

A separating system and method, of which the separating system includes a lower vessel including an inlet configured to receive a mixed fluid comprising a solid and a liquid. The lower vessel is configured to separate at least some of the solid from the liquid so as to produce a partially-separated fluid. The system also includes a first screen vessel configured to receive at least a portion of the partially-separated fluid, the first screen vessel including a first shell, and a first screen that is positioned within the first shell and at least partially removable therefrom, and a second screen vessel spatially oriented parallel to the first screen vessel and configured to receive at least a portion of the partially-separated fluid. The second screen vessel includes a second shell and a second screen that is positioned within the second shell and is at least partially removable therefrom.

22 Claims, 7 Drawing Sheets

(56) References Cited

U.S. PATENT DOCUMENTS

| | | | | |
|---|---|---|---|---|
| 1,455,871 A * | 5/1923 | Fleming | F04B 47/005 | 210/488 |
| 1,519,042 A * | 12/1924 | Osborne | F04B 47/005 | 166/105.4 |
| 1,534,129 A * | 4/1925 | Marden | B01D 35/02 | 210/318 |
| 1,652,173 A * | 12/1927 | Lalor | B01D 29/58 | 210/183 |
| 1,871,870 A * | 8/1932 | Bacheldor | B01D 29/41 | 210/323.1 |
| 1,919,031 A * | 7/1933 | Nuhleisen | B01D 35/12 | 137/601.01 |
| 2,010,947 A * | 8/1935 | Dunlap | E21B 43/38 | 166/149 |
| 2,041,366 A * | 5/1936 | Moran | B01D 35/02 | 210/411 |
| 2,326,484 A * | 8/1943 | Moreton | B01D 29/39 | 210/138 |
| 2,657,760 A * | 11/1953 | Glasgow | E21B 43/34 | 96/184 |
| 2,681,736 A * | 6/1954 | Voorheis | B01D 35/12 | 137/625.29 |
| 2,706,531 A * | 4/1955 | Lovelady | B01D 19/00 | 126/360.1 |
| 2,710,071 A * | 6/1955 | Kinser | E21B 43/36 | 137/122 |
| 2,765,083 A * | 10/1956 | Purmort | B01D 29/6446 | 210/236 |
| 2,910,136 A * | 10/1959 | Valliant | B01D 45/02 | 55/421 |
| 2,936,075 A * | 5/1960 | Davis | B01D 29/6446 | 210/236 |
| 2,937,503 A * | 5/1960 | Swearingen | F25B 9/06 | 62/619 |
| 2,979,204 A * | 4/1961 | Yeiser | B01D 29/70 | 210/805 |
| 2,992,814 A * | 7/1961 | Maher | B01D 47/00 | 55/482 |
| 3,094,574 A * | 6/1963 | Glasgow | F26B 21/083 | 261/36.1 |
| 3,193,990 A * | 7/1965 | Smith | C10G 33/06 | 96/407 |
| 3,228,174 A * | 1/1966 | Perry | B01D 19/0052 | 95/253 |
| 3,252,577 A * | 5/1966 | Anderson | B01D 29/41 | 210/236 |
| 3,310,171 A * | 3/1967 | Zievers | B01D 29/72 | 210/791 |
| 3,349,547 A * | 10/1967 | Hoipkemeier | B01D 50/00 | 55/324 |
| 3,362,542 A * | 1/1968 | Stevens | E03B 3/16 | 210/801 |
| 3,394,735 A * | 7/1968 | Wurster | B01D 35/12 | 251/161 |
| 3,615,016 A * | 10/1971 | Soriente et al. | B01D 29/96 | 210/232 |
| 3,618,781 A * | 11/1971 | Brown | B01D 35/12 | 137/545 |
| 3,622,006 A * | 11/1971 | Brunner | B01D 35/14 | 210/448 |
| 3,646,730 A * | 3/1972 | Reid | B01D 46/2407 | 55/302 |
| 3,664,003 A * | 5/1972 | Wapner | G21C 19/10 | 976/DIG. 251 |
| 3,679,060 A * | 7/1972 | Smith | B01D 35/12 | 210/333.1 |
| 3,793,812 A * | 2/1974 | Willis | B01D 45/12 | 55/338 |
| 3,814,256 A * | 6/1974 | McGovern | B01D 29/52 | 210/323.2 |
| 3,884,660 A * | 5/1975 | Perry, Jr. | B01D 45/12 | 55/396 |
| 3,888,644 A * | 6/1975 | Holland | B01D 46/00 | 55/318 |
| 3,900,401 A * | 8/1975 | Oliver | B01D 35/12 | 210/436 |
| 3,935,108 A * | 1/1976 | Forgues | B01D 35/00 | 137/599.14 |
| 4,106,562 A * | 8/1978 | Barnes | B01D 35/02 | 166/227 |
| 4,180,391 A * | 12/1979 | Perry, Jr. | B01D 45/16 | 55/324 |
| 4,237,011 A * | 12/1980 | Acosta | B01D 29/90 | 210/237 |
| 4,297,116 A * | 10/1981 | Cusick | B01D 46/002 | 55/319 |
| 4,411,779 A * | 10/1983 | McConnell, III | B01D 24/007 | 210/275 |
| 4,428,838 A * | 1/1984 | Creps | B01D 29/15 | 210/323.2 |
| 4,496,463 A * | 1/1985 | Desai | B01D 35/12 | 137/601.01 |
| 4,504,391 A * | 3/1985 | Weems, Sr. | B01D 29/15 | 210/489 |
| 4,539,023 A * | 9/1985 | Boley | E21B 43/36 | 96/184 |
| 4,591,367 A * | 5/1986 | Pek | B04C 3/06 | 55/347 |
| 4,631,127 A * | 12/1986 | Condit, Sr. | B01D 35/12 | 210/232 |
| 4,661,127 A * | 4/1987 | Huntley | E21B 43/36 | 166/267 |
| 4,664,798 A * | 5/1987 | Bergh | B01D 35/12 | 210/450 |
| 4,673,500 A * | 6/1987 | Hoofnagle | B01D 11/0219 | 210/307 |
| D292,215 S * | 10/1987 | Bergh | | D15/7 |
| 4,769,136 A * | 9/1988 | McCormick | B01D 35/12 | 74/606 R |
| 4,836,017 A * | 6/1989 | Bozek | G01F 1/74 | 73/152.42 |
| 4,923,068 A * | 5/1990 | Crowson | B01D 29/66 | 210/741 |
| 4,978,373 A * | 12/1990 | Endacott | B01D 19/00 | 96/187 |
| 5,053,141 A * | 10/1991 | Lai | B01D 29/72 | 210/741 |
| 5,064,448 A * | 11/1991 | Choi | B01D 19/0057 | 96/209 |
| 5,073,260 A * | 12/1991 | Wilkendorf | B01D 35/12 | 210/424 |
| 5,149,344 A * | 9/1992 | Macy | B01D 17/0208 | 96/182 |
| 5,149,449 A * | 9/1992 | Strid | B01D 29/66 | 210/411 |
| 5,223,136 A * | 6/1993 | Gilbert | B01D 29/96 | 210/457 |
| 5,247,727 A * | 9/1993 | Harris | B25B 27/023 | 29/259 |
| 5,249,635 A * | 10/1993 | King | E21B 21/08 | 175/48 |
| 5,443,722 A * | 8/1995 | Desai | B01D 35/12 | 137/625.21 |
| 5,460,733 A * | 10/1995 | Rasmussen | B01D 29/885 | 210/791 |
| 5,663,121 A * | 9/1997 | Moody | E21B 21/16 | 175/71 |
| 5,769,955 A * | 6/1998 | Kozisek | F16L 55/46 | 134/8 |
| 5,775,442 A * | 7/1998 | Speed | E21B 41/005 | 175/218 |
| 5,785,870 A * | 7/1998 | Davis | B01D 29/48 | 210/488 |
| 5,865,992 A * | 2/1999 | Edmondson | B01D 17/0211 | 210/DIG. 5 |
| 5,900,137 A * | 5/1999 | Homan | B01D 21/0039 | 175/48 |

(56) References Cited

U.S. PATENT DOCUMENTS

| | | | | |
|---|---|---|---|---|
| 5,919,284 A * | 7/1999 | Perry, Jr. | B01D 45/02 | 55/319 |
| 5,919,376 A * | 7/1999 | Carman | B03D 1/1418 | 210/411 |
| 5,928,519 A * | 7/1999 | Homan | B01D 21/0042 | 175/48 |
| 6,119,711 A * | 9/2000 | Dougherty | B01D 53/26 | 137/203 |
| 6,168,647 B1 * | 1/2001 | Perry, Jr. | B01D 46/64 | 95/286 |
| 6,197,195 B1 * | 3/2001 | Booth | B01D 29/96 | 137/630.17 |
| 6,270,669 B1 * | 8/2001 | Bauer | B01D 35/05 | 210/237 |
| 6,592,756 B1 * | 7/2003 | Felix, Jr. | E04H 4/14 | 210/477 |
| 6,709,586 B2 * | 3/2004 | Mason | B01D 29/114 | 210/237 |
| 6,730,219 B2 * | 5/2004 | Turchetti | B01D 29/118 | 210/237 |
| 6,841,007 B1 * | 1/2005 | Howard | B01D 29/114 | 134/8 |
| 6,893,558 B1 * | 5/2005 | McGee | B01D 21/265 | 210/170.01 |
| 6,983,852 B2 * | 1/2006 | Hemstock | E21B 43/34 | 210/519 |
| 7,014,685 B2 * | 3/2006 | Burns | B01D 29/114 | 55/356 |
| 7,048,865 B1 * | 5/2006 | McGee | E21B 43/34 | 166/75.12 |
| 7,108,738 B2 * | 9/2006 | Burns | B01D 29/114 | 55/356 |
| 7,223,298 B2 * | 5/2007 | Platt | B01D 46/0004 | 210/340 |
| 7,297,279 B2 * | 11/2007 | Johnson | B01D 17/045 | 210/669 |
| 7,347,945 B2 * | 3/2008 | Amado | B01D 17/005 | 166/267 |
| 7,364,661 B2 * | 4/2008 | Puik | B01D 17/00 | 210/744 |
| 7,383,958 B2 * | 6/2008 | Hemstock | E21B 43/34 | 166/75.12 |
| RE40,721 E * | 6/2009 | Desai | B01D 29/35 | 137/625.21 |
| 7,540,902 B2 * | 6/2009 | Esparza | E21B 43/34 | 96/182 |
| 7,670,528 B2 * | 3/2010 | Patel | B01D 29/213 | 264/287 |
| 7,695,697 B2 * | 4/2010 | D'Orazio | C10C 3/00 | 422/243 |
| 7,731,037 B2 * | 6/2010 | Frazier | B01D 21/24 | 210/532.1 |
| RE41,556 E * | 8/2010 | McGee | B01D 21/265 | 166/75.12 |
| 7,896,959 B1 * | 3/2011 | Schopf, Jr. | B01D 46/10 | |
| 7,981,379 B2 * | 7/2011 | Hughes | C01B 13/02 | 422/224 |
| 8,002,983 B2 * | 8/2011 | Wanni | B01D 29/58 | 210/411 |
| 8,025,806 B2 * | 9/2011 | Lehman | B01D 21/24 | 166/267 |
| 8,029,670 B2 * | 10/2011 | Dietenhauser | B01D 33/803 | 210/236 |
| 8,127,867 B1 * | 3/2012 | Droke | E21B 21/065 | 175/206 |
| 8,133,300 B1 * | 3/2012 | Gonsalves, III | B01D 19/0042 | 95/254 |
| 8,236,182 B2 * | 8/2012 | Lehman | B01D 21/0006 | 166/267 |
| 8,308,959 B2 * | 11/2012 | Noles, Jr. | B01D 21/0045 | 96/182 |
| 8,439,112 B1 * | 5/2013 | Droke | E21B 21/065 | 166/267 |
| 8,454,843 B2 * | 6/2013 | Brown | B01D 21/2405 | 166/267 |
| 8,529,756 B2 * | 9/2013 | Lehman | B01D 21/24 | 210/170.01 |
| 8,551,345 B2 * | 10/2013 | Brown | B01D 21/2444 | 210/801 |
| 8,623,221 B1 * | 1/2014 | Boyd | B01D 21/2494 | 96/182 |
| 8,771,509 B2 * | 7/2014 | Huang | C02F 11/121 | 210/237 |
| 8,794,263 B2 * | 8/2014 | Scott | B01D 46/88 | 264/497 |
| 8,881,803 B1 * | 11/2014 | Frost | E21B 27/005 | 166/205 |
| 8,936,661 B2 * | 1/2015 | Burns | B01D 46/0024 | 55/482 |
| 8,945,256 B2 * | 2/2015 | Hemstock | B01D 21/2483 | 55/319 |
| 8,945,395 B2 * | 2/2015 | Tweit | B01D 45/08 | 210/801 |
| 8,951,333 B2 * | 2/2015 | Cabourdin | B01D 46/0058 | 95/22 |
| 8,961,792 B2 * | 2/2015 | Desai | B01D 35/12 | 210/418 |
| 8,986,431 B2 * | 3/2015 | Cabourdin | B01D 46/90 | 55/482 |
| 9,004,106 B2 * | 4/2015 | Schlichter | F16K 31/44 | 137/637 |
| 9,095,799 B1 * | 8/2015 | Packard | E21B 21/063 | |
| 9,327,214 B2 * | 5/2016 | Hemstock | E21B 27/00 | |
| 9,327,219 B2 * | 5/2016 | Brunswick | B01D 29/114 | |
| 9,345,994 B2 * | 5/2016 | Morris | B01D 35/02 | |
| 9,358,484 B2 * | 6/2016 | Tange | B01D 33/39 | |
| 9,421,484 B2 * | 8/2016 | Ford | E21B 17/1071 | |
| 9,631,641 B2 * | 4/2017 | Choi | F04D 29/708 | |
| 9,649,584 B2 * | 5/2017 | Burns | B01D 46/0023 | |
| 9,744,485 B2 * | 8/2017 | Burns | C02F 1/385 | |
| 9,751,032 B2 * | 9/2017 | Desai | F16K 11/02 | |
| 9,759,057 B2 * | 9/2017 | Morin | E21B 43/34 | |
| 9,803,459 B1 * | 10/2017 | Leal | B01D 21/2405 | |
| 9,815,012 B2 * | 11/2017 | Cloud | B01D 46/2411 | |
| 9,816,338 B1 * | 11/2017 | Hanson | E21B 43/084 | |
| 9,909,405 B2 * | 3/2018 | Hemstock | B01D 21/2483 | |
| 9,937,442 B2 * | 4/2018 | Hendrix | E21B 43/34 | |
| 9,938,812 B2 * | 4/2018 | Hemstock | B01D 19/0042 | |
| 10,036,217 B2 * | 7/2018 | Munisteri | E21B 43/18 | |
| 10,137,391 B2 * | 11/2018 | Burns | B01D 29/96 | |
| 10,252,196 B2 * | 4/2019 | Duhon | B01D 29/23 | |
| 10,280,719 B1 * | 5/2019 | O'Neal | E21B 34/14 | |
| 10,315,138 B2 * | 6/2019 | Duhon | B01D 29/35 | |
| 10,343,096 B2 * | 7/2019 | Cloud | B01D 46/62 | |
| 10,384,154 B2 * | 8/2019 | Morris | B01D 29/356 | |
| 10,494,965 B2 * | 12/2019 | Fontecchio | B01D 35/30 | |
| 10,525,381 B2 * | 1/2020 | McNaughton | E21B 43/35 | |
| 10,556,194 B2 * | 2/2020 | Hendrix | E21B 43/34 | |
| 10,557,323 B2 * | 2/2020 | Pope | E21B 21/065 | |
| 10,577,911 B2 * | 3/2020 | Morin | E21B 43/34 | |
| 10,655,432 B2 * | 5/2020 | Bowley | B07B 1/469 | |
| 10,710,013 B2 * | 7/2020 | Mueller | B01D 45/16 | |
| D894,328 S * | 8/2020 | Goldman | D23/209 | |
| 10,751,649 B2 * | 8/2020 | Rogers Hicks | B01D 29/6438 | |
| 10,758,850 B2 * | 9/2020 | Burns | B01D 29/58 | |
| 10,926,205 B2 * | 2/2021 | Thorat | B01D 24/10 | |
| 10,941,682 B2 * | 3/2021 | Fontecchio | B01D 35/30 | |
| 10,974,184 B2 * | 4/2021 | Scott | B22F 3/11 | |
| 11,040,299 B2 * | 6/2021 | Ben Horin | F16K 11/22 | |
| 11,071,934 B2 * | 7/2021 | Cloud | B01D 46/64 | |
| 11,148,071 B2 * | 10/2021 | Kelsey | B01D 17/045 | |
| 11,149,528 B2 * | 10/2021 | O'Neal | E21B 34/14 | |
| 11,185,798 B2 * | 11/2021 | Nagge | B01D 21/0036 | |
| D938,549 S * | 12/2021 | Ben-Horin | D23/207 | |
| D940,269 S * | 1/2022 | Ben-Horin | D23/207 | |
| 11,235,266 B2 * | 2/2022 | Burns | B01D 29/237 | |
| 11,285,410 B2 * | 3/2022 | Schaefer | B01D 29/52 | |
| 11,293,240 B2 * | 4/2022 | Morin | B01D 21/267 | |
| 11,389,759 B2 * | 7/2022 | Gao | B01D 46/0005 | |

(56) References Cited

U.S. PATENT DOCUMENTS

| | | | |
|---|---|---|---|
| 11,530,771 B2* | 12/2022 | Trifol | F16L 55/1108 |
| 2003/0155289 A1* | 8/2003 | Barnhart | B01D 24/042 |
| | | | 210/237 |
| 2004/0074838 A1* | 4/2004 | Hemstock | E21B 43/34 |
| | | | 210/513 |
| 2004/0168958 A1* | 9/2004 | Eggleston | B01D 29/117 |
| | | | 210/95 |
| 2005/0017513 A1* | 1/2005 | Sipp | F03B 17/063 |
| | | | 290/54 |
| 2005/0056583 A1* | 3/2005 | Diemer | B01D 29/96 |
| | | | 210/407 |
| 2005/0172590 A1* | 8/2005 | Burns | B01D 29/114 |
| | | | 55/498 |
| 2005/0172810 A1* | 8/2005 | Burns | B01D 29/114 |
| | | | 95/273 |
| 2005/0279716 A1* | 12/2005 | Jackman | B01D 65/00 |
| | | | 210/791 |
| 2006/0021929 A1* | 2/2006 | Mannheim | C02F 3/1273 |
| | | | 210/321.6 |
| 2006/0070735 A1* | 4/2006 | Guerra | E21B 43/35 |
| | | | 175/207 |
| 2006/0207426 A1* | 9/2006 | Platt | B01D 46/0004 |
| | | | 95/286 |
| 2008/0245720 A1* | 10/2008 | Hutchinson | B01D 46/522 |
| | | | 210/236 |
| 2008/0245725 A1* | 10/2008 | Patel | B01D 46/2411 |
| | | | 210/457 |
| 2008/0246182 A1* | 10/2008 | Patel | B01D 46/522 |
| | | | 264/259 |
| 2008/0251467 A1* | 10/2008 | Wanni | B01D 50/00 |
| | | | 210/201 |
| 2008/0308504 A1* | 12/2008 | Hallan | B01D 29/96 |
| | | | 210/741 |
| 2009/0152213 A1* | 6/2009 | Frazier | B01D 21/0006 |
| | | | 210/800 |
| 2010/0116732 A1* | 5/2010 | Jung | B01D 35/02 |
| | | | 210/447 |
| 2010/0155336 A1* | 6/2010 | Simonson | B03C 1/286 |
| | | | 210/695 |
| 2010/0206816 A1* | 8/2010 | Frazier | E21B 43/34 |
| | | | 210/744 |
| 2010/0294317 A1* | 11/2010 | Dufrene | B01D 21/2494 |
| | | | 134/22.18 |
| 2011/0266228 A1* | 11/2011 | Brown | B01D 21/2444 |
| | | | 210/801 |
| 2012/0000835 A1* | 1/2012 | Desai | B01D 35/12 |
| | | | 210/323.1 |
| 2012/0006757 A1* | 1/2012 | Lehman | B01D 21/02 |
| | | | 210/747.1 |
| 2012/0111196 A1* | 5/2012 | Schook | B01D 45/16 |
| | | | 95/271 |
| 2012/0210688 A1* | 8/2012 | Burns | B01D 46/2411 |
| | | | 55/483 |
| 2013/0020253 A1* | 1/2013 | Lehman | B01D 21/02 |
| | | | 210/513 |
| 2013/0025246 A1* | 1/2013 | Burns | B01D 29/232 |
| | | | 55/498 |
| 2013/0032549 A1* | 2/2013 | Brown | B01D 21/245 |
| | | | 210/800 |
| 2013/0062273 A1* | 3/2013 | Burns | B01D 29/52 |
| | | | 210/450 |
| 2013/0105416 A1* | 5/2013 | Whitehead | B01D 29/35 |
| | | | 210/348 |
| 2013/0134109 A1* | 5/2013 | Tweit | E21B 43/34 |
| | | | 210/803 |
| 2013/0140247 A1* | 6/2013 | Ford | B01D 35/02 |
| | | | 137/544 |
| 2013/0200012 A1* | 8/2013 | Holmes | B01D 21/0012 |
| | | | 210/323.1 |
| 2013/0206674 A1* | 8/2013 | Fraser | B01D 29/117 |
| | | | 210/323.1 |
| 2013/0256212 A1* | 10/2013 | Ben-Horin | B01D 29/114 |
| | | | 55/482 |
| 2014/0027357 A1* | 1/2014 | Morris | B01D 29/52 |
| | | | 210/85 |
| 2014/0130673 A1* | 5/2014 | Cabourdin | B01D 46/90 |
| | | | 55/327 |
| 2014/0332473 A1* | 11/2014 | Haberman | B01D 36/02 |
| | | | 210/741 |
| 2014/0338293 A1* | 11/2014 | Williams | B01D 35/12 |
| | | | 55/482 |
| 2015/0034185 A1* | 2/2015 | Winborn | B01D 35/28 |
| | | | 137/544 |
| 2015/0041401 A1* | 2/2015 | Williamson | B03C 1/30 |
| | | | 210/695 |
| 2015/0048033 A1* | 2/2015 | Burns | B01D 29/661 |
| | | | 210/741 |
| 2015/0090122 A1* | 4/2015 | Hemstock | B01D 45/02 |
| | | | 96/197 |
| 2015/0122498 A1* | 5/2015 | Duesel, Jr. | C02F 1/048 |
| | | | 166/305.1 |
| 2015/0196999 A1* | 7/2015 | Sampath | B25B 27/14 |
| | | | 81/418 |
| 2015/0292313 A1* | 10/2015 | Morin | E21B 43/34 |
| | | | 166/267 |
| 2015/0299583 A1* | 10/2015 | Kelsey | C10L 3/10 |
| | | | 210/799 |
| 2015/0314225 A1* | 11/2015 | Parsons | B01D 29/52 |
| | | | 210/237 |
| 2016/0074781 A1* | 3/2016 | Winborn | F16K 27/06 |
| | | | 137/550 |
| 2016/0082377 A1* | 3/2016 | Hemstock | B01D 21/2494 |
| | | | 55/319 |
| 2016/0097247 A1* | 4/2016 | Marco | B01D 29/62 |
| | | | 166/305.1 |
| 2016/0158676 A1* | 6/2016 | Hawkins | B01D 29/96 |
| | | | 210/238 |
| 2016/0377094 A1* | 12/2016 | Choi | F04D 1/00 |
| | | | 210/798 |
| 2017/0021289 A1* | 1/2017 | Rogers Hicks | B01D 39/10 |
| 2017/0036145 A1* | 2/2017 | Duhon | B01D 29/35 |
| 2017/0043278 A1* | 2/2017 | Kelsey | B01D 17/10 |
| 2017/0080364 A1* | 3/2017 | Duhon | B01D 29/23 |
| 2017/0182435 A1* | 6/2017 | Morris | B01D 29/66 |
| 2017/0233262 A1* | 8/2017 | Duesel, Jr. | E21B 43/26 |
| | | | 210/179 |
| 2017/0328158 A1* | 11/2017 | Hanson | E21B 27/005 |
| 2017/0335669 A1* | 11/2017 | Morin | E21B 43/34 |
| 2018/0118536 A1* | 5/2018 | Nagge | B66F 3/24 |
| 2018/0133623 A1* | 5/2018 | Nagge | B01D 21/003 |
| 2018/0221789 A1* | 8/2018 | Hendrix | E21B 43/34 |
| 2019/0017351 A1* | 1/2019 | Bowley | B07B 1/55 |
| 2019/0023589 A1* | 1/2019 | Norman | C02F 1/465 |
| 2019/0063279 A1* | 2/2019 | Fontecchio | B01D 29/54 |
| 2019/0201817 A1* | 7/2019 | Morin | B01D 35/0273 |
| 2019/0264546 A1* | 8/2019 | O'Neal | E21B 21/065 |
| 2019/0344202 A1* | 11/2019 | Hiat | F28G 9/00 |
| 2019/0366242 A1* | 12/2019 | McNaughton | B01D 21/2472 |
| 2019/0374879 A1* | 12/2019 | Nagge | B01D 21/0018 |
| 2020/0047089 A1* | 2/2020 | Cook | B01D 29/35 |
| 2020/0063616 A1* | 2/2020 | Fontecchio | B01D 29/54 |
| 2020/0072004 A1* | 3/2020 | Morin | E21B 21/065 |
| 2020/0086235 A1* | 3/2020 | Barclay | B01D 46/003 |
| 2020/0130017 A1* | 4/2020 | Trifol | E21B 23/06 |
| 2020/0132240 A1* | 4/2020 | Trifol | E21B 19/00 |
| 2020/0141220 A1* | 5/2020 | Loranger | B01D 21/262 |
| 2020/0171410 A1* | 6/2020 | Hendrix | E21B 43/34 |
| 2020/0188821 A1* | 6/2020 | Muenster | B01D 63/12 |
| 2021/0069619 A1* | 3/2021 | Ben Horin | F16K 11/22 |
| 2022/0032212 A1* | 2/2022 | Kelsey | C10L 3/10 |
| 2022/0307363 A1* | 9/2022 | Nagge | E21B 33/03 |

* cited by examiner

HORIZONTAL SAND SEPARATOR ASSEMBLY

BACKGROUND

Hydraulic fracturing is a well-treatment process in which preferential flowpaths for hydrocarbons are established in a subterranean rock formation by pumping a fluid at high pressures into a well to initiate fractures in the rock formation. The fluid is predominately water, but also may include solids, such as sand or ceramic proppants, that may serve to at least partially fill the fractures and maintain the preferential flowpaths.

When oil or other fluids are produced/recovered from the well, it may be desirable to remove sand or other solids from the produced fluid. A separator system may be employed to perform this function. Such separators generally include gravity-based tanks that receive fluid from a pipe line. The tanks can be vertically or horizontally oriented and are essentially vessels of larger diameter than the pipe line; thus, the velocity of the fluid slows upon entering the vessel, allowing the solids to sink to the bottom. Upon leaving the tank, the velocity of the fluid may again increase. The tanks may also include baffles, turns, etc., which may further facilitate solids separation from the fluid. Further, some separators employ screens, against which the fluid impinges, which tends to cause the solids to collide with the screens and drop out of suspension in the fluid, separating it out from the fluid flow, which flows through the screen.

These separator systems have maintenance requirements. For example, the solids separated from the fluid within the system may need to be removed from the system occasionally. There are a variety of ways to accomplish this, including backflow, removing and washing filter screens, etc. Oftentimes, however, the separator system goes offline to allow for such maintenance. The separator may thus be bypassed (e.g., if a backup system is available), or the production may he halted, to allow operators to access the screen-containing vessels and clean the screens. This may result in costly increases in machinery, non-productive time, or both.

SUMMARY

Embodiments of the disclosure may provide a separating system that includes a lower vessel including an inlet configured to receive a mixed fluid comprising a solid and a liquid. The lower vessel is configured to separate at least some of the solid from the liquid so as to produce a partially-separated fluid. The system also includes a first screen vessel configured to receive at least a portion of the partially-separated fluid, the first screen vessel including a first shell, and a first screen that is positioned within the first shell and at least partially removable therefrom, and a second screen vessel spatially oriented parallel to the first screen vessel and configured to receive at least a portion of the partially-separated fluid. The second screen vessel includes a second shell and a second screen that is positioned within the second shell and is at least partially removable therefrom.

Embodiments of the disclosure may also provide a method that includes separating a portion of a solid content from a liquid in a fluid suspension using a lower vessel, a first screen vessel, and a second screen vessel to generate a partially-separated fluid. The partially-separated fluid flows from the lower vessel to the first and second screen vessels. The method also includes stopping the flow of the partially-separated fluid from the lower vessel to the first screen vessel. The partially-separated fluid continues to flow from the lower vessel to the second screen vessel when the flow of the partially-separated fluid from the lower vessel to the first screen vessel is stopped. The method further includes opening a service closure of the first screen vessel after stopping the flow to the first screen vessel, at least partially removing a screen from within the first screen vessel through the opened service closure, cleaning the screen, reinserting the screen into the first screen vessel after cleaning the screen, closing the service closure after reinserting the screen, and resuming the flow of the partially-separated fluid to the first screen vessel after closing the service closure.

Embodiments of the disclosure may further provide a separating system that includes a lower vessel configured to receive a mixed flow comprising a solid and a liquid and to separate at least some of the solid from the liquid so as to produce a partially-separated flow, a first screen vessel coupled to the lower vessel and configured to receive at least a portion of the partially-separated fluid therefrom, a first screen removably positioned within the first screen vessel, such that the at least a portion of the partially-separated fluid introduced into the first screen vessel flows through the first screen, a second screen vessel coupled to the lower vessel and configured to receive at least another portion of the partially-separated fluid therefrom, and a second screen removably positioned within the second screen vessel, such that at least another portion of the partially-separated fluid introduced into the second screen vessel flows through the second screen. The system is configured to control the flow of the partially-separated fluid to the first screen vessel independently of the flow of the partially-separated fluid to the second screen vessel.

The foregoing summary is intended merely to introduce some aspects of the following disclosure and is thus not intended to be exhaustive, identify key features, or in any way limit the disclosure or the appended claims.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

Figure 1A:
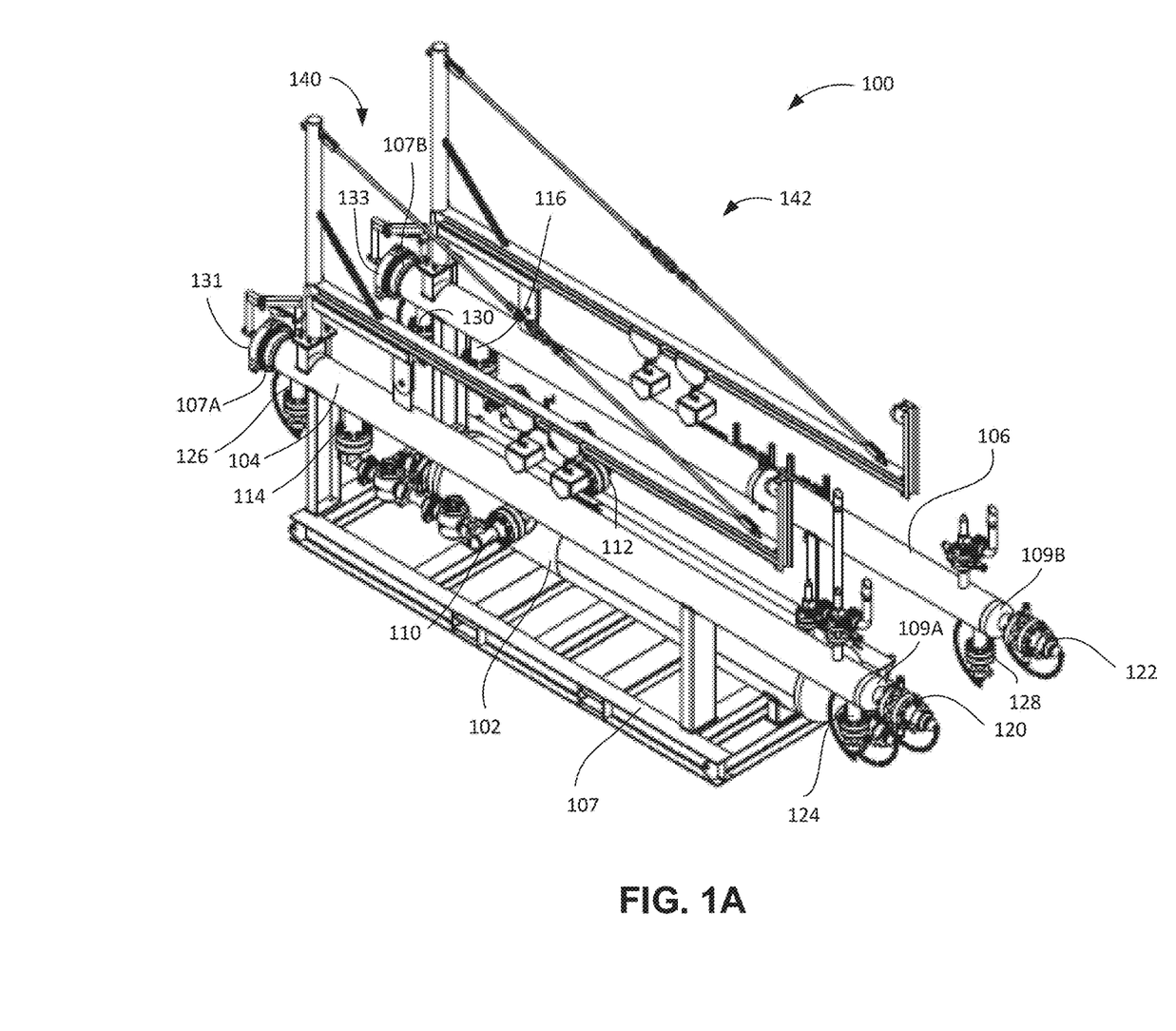
FIG. 1A illustrates a perspective view of a separator system, according to an embodiment.
Figure 1B:
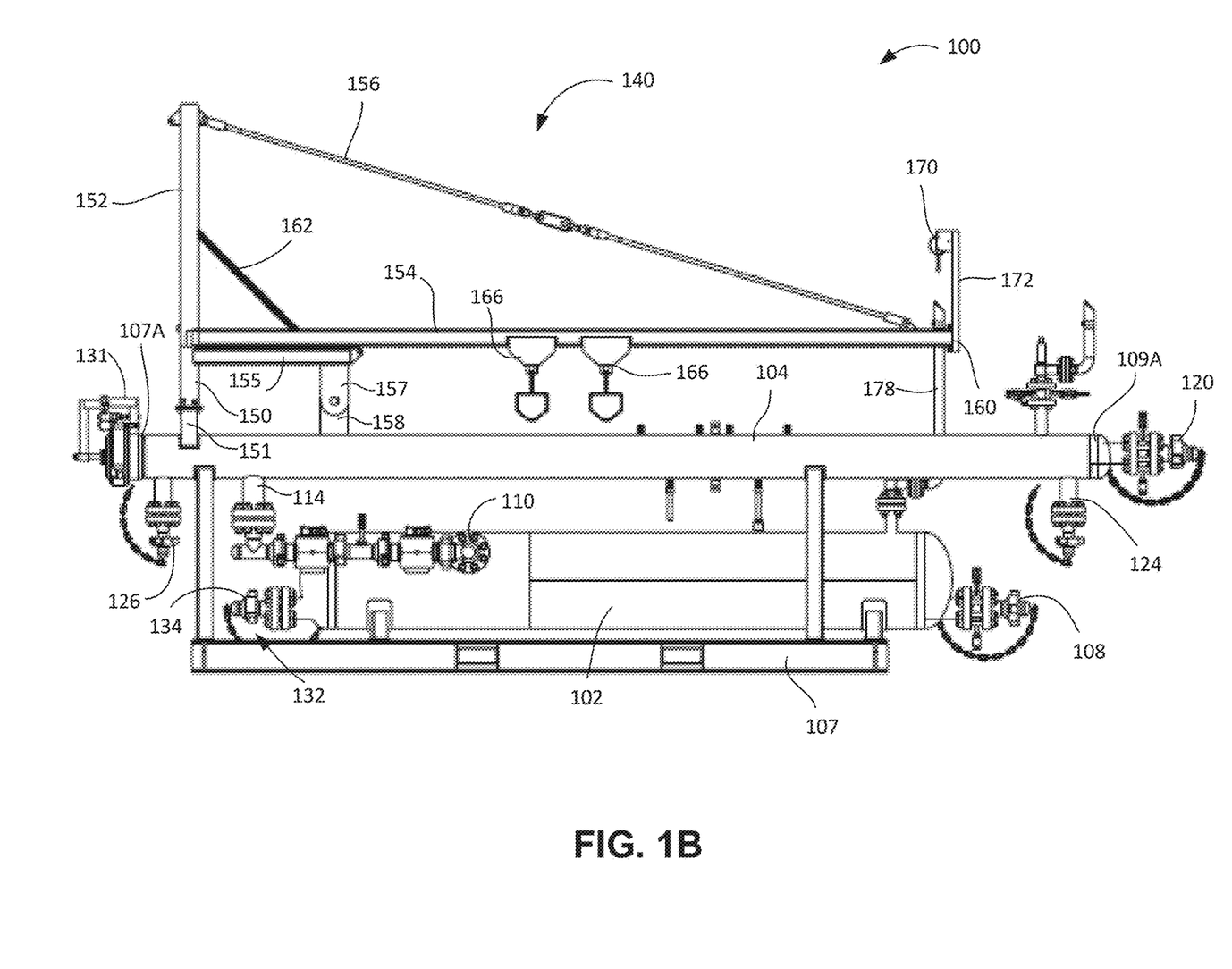
FIG. 1B illustrates a side, elevation view of the separator system, according to an embodiment.

FIG. 1A illustrates a perspective view of a separator system 100, according to an embodiment. FIG. 1B illustrates a side, elevation view of the separator system 100, according to an embodiment. The system 100 shown in FIGS. 1A and 1B may be configured to remove sand or other solids (e.g., ceramic proppant) from a fluid, such as a hydrocarbon. The system 100 may be sized to work in various systems, across a range of flowrates and separation specifications.

In the illustrated embodiment, the system 100 includes three horizontal vessels: a lower vessel 102, a first screen vessel 104, and a second screen vessel 106. In an embodiment, the vessels 102, 104, 106 may be generally cylindrical, and may be parallel to one another, that is, spatially oriented such that the central longitudinal axes of each of the cylindrical vessels 102, 104, 106 may be generally parallel. In a specific example, the vessels 102, 104, 106 may be spatially oriented generally horizontally, that is, generally parallel to the ground, as shown. In some embodiments, the lower vessel 102 may be positioned vertically lower than the screen vessels 104, 106. In some embodiments, the screen vessels 104, 106 may be positioned and generally the same elevation (as shown). The lower vessel 102, the first screen vessel 104, and/or the second screen vessel 106 may be supported on a skid 107, but in other embodiments, may be individually supported on the ground or supported on another style of base.

The lower vessel 102 may have an inlet 108, which may be configured to receive a mixed fluid, i.e., a fluid potentially containing solids to be removed. The lower vessel 102 may be hollow and may include weirs, baffles, perforated plates, tortious flowpaths, etc., to enhance inertial or gravity-based separation, as will be described in greater detail below. The lower vessel 102 may thus serve as a velocity slowdown chamber, which receives the mixed fluid and slows its flowrate so that the solids drop out of suspension. The lower vessel 102 may also or instead function as a slug device (or "slug catcher"), which may be configured to prevent pockets ("slugs") of solids or liquids from reaching the screen vessels 104, 106. The lower vessel 102 may further or instead function as a sump vessel, serving to receive sand that drops out of the first and second screen vessels 104, 106.

The lower vessel 102 may include two or more fluid outlets 110, 112. The fluid outlets 110, 112 may be positioned proximate to the top of the lower vessel 102, e.g., vertically above the central axis of the lower vessel 102, such that at least some of solids may settle to the bottom of the vessel 102 and be prevented from reaching the fluid outlets 110, 112.

The fluid outlets 110, 112 may be connected to fluid inlets 114, 116 of the first and second screen vessels 104, 106, respectively. Valves, pipes, fittings, flanges, bleed assemblies, etc. may be provided between the fluid outlets 110, 112 and the fluid inlets 114, 116, to allow and/or control fluid flow therebetween, as will be described in greater detail below. Accordingly, the fluid that exits from the lower vessel 102 may be received into the first and second screen vessels 104, 106 via the fluid inlets 114, 116. The system 100 may be configured to allow fluid to flow from the lower vessel 102 into both fluid inlets 114, 116 at the same time, but may be configurable to prevent flow from going into either or both of the fluid inlets 114, 116 e.g., via operation of one or more valves.

As will be described in greater detail below, slot-type screens or other types of screens (or any other suitable filter media) may be positioned within each of the first and second screen vessel 104, 106. Fluid may flow, for example, radially inward through the screens, while sand or other solids are prevented from flowing past the screens.

The first and second screen vessels 104, 106 may each include two opposite ends 107A, 107B, 109A, 109B. The fluid inlets 114, 116 may be positioned proximal to the ends 107A, 107B. Proximate to the ends 109A, 109B, the first and second screen vessels 104, 106 may each include include fluid outlets 120, 122, respectively. Accordingly, fluid flows into the screen vessels 104, 106 via the inlets 114, 116, along and radially through the screens within the first and second screen vessels 104, 106, and to the fluid outlets 120, 122. Fluid from the fluid outlets 120, 122 and may be combined into a combined flow downstream of the fluid outlets 120, 122. For example, large liquid slugs may entrain the sand in the lower vessel 102 and carry the sand up to the screen vessel 104, 106 where they are stopped by the screen(s) positioned therein. After the slug has finished flowing through the system 100, at least some of the sand which has been prevented from passing through the system 100 by the screens may drain back into the lower vessel 102 acting as a sump, as mentioned above.

Further, the first and second screen vessels 104, 106 may each include one or more (e.g., two each) drains 124, 126, 128, 130. For example, one drain 124-130 may be positioned proximate to each of the ends 107A, 107B, 109A, 109B. The drains 124-130 may be employed to support removal of solids that are prevented from flowing through the screens within the first and second screen vessels 104, 106, e.g., during washout operations.

The first and second screen vessels 104, 106 may also include service closures 131, 133 positioned proximate to the ends 10 7A, 107B (e.g., near the fluid inlets 114, 116). In at least one embodiment, the service closures 131, 133 may be hammer closures, and may be configured to be opened to expose the interior of the first and second screen vessels 104, 106. Once the service closures 131, 133 are opened, the screens (or other filter media) within the screen vessels 104, 106 may be removed, e.g., for cleaning, as will be described in greater detail below.

The system 100 may include a blowdown assembly 132, which may be connected to the lower vessel 102 via a blowdown drain 134 and the mixed fluid inlet 108. In some embodiments, valves and piping may be provided to open and close the blowdown drain 134. When the blowdown drain 134 is open, fluid and solids that may have accumulated in the lower vessel 102 may be directed from the blowdown drain 134 to a blowdown storage unit, which may be emptied periodically, e.g., by a truck. Accordingly, when removal of accumulated solids from the lower vessel 102 is desired, the mixed fluid inlet 108 and the fluid outlets 110, 112 may be closed, leaving the lower vessel 102 containing pressurized fluid. The blowdown drain 134 may then be opened, allowing for the evacuation of the pressurized fluid, along with the accumulated solids, through the blowdown drain 134, thereby cleaning the vessel 102. During normal operation of the system 100, the blowdown assembly 132 may be inactive, e.g., the blowdown drain 134 may be closed.

The system 100 may include one or more cranes (two shown: 140, 142). The cranes 140, 142 may each be coupled to one of the first and second screen vessels 104, 106, although in some embodiments, the cranes 140, 142 may be coupled elsewhere in the system 100 (e.g., on a base, independently, etc.).

For the sake of brevity, the crane 140 (as best shown in FIG. 1B) will be described as an example of either or both of the cranes 140, 142. The crane 140 may include a base 150 that is secured to the first screen vessel 104, e.g., via a bracket 151. The crane 140 also includes an upright 152, which is coupled to the base 150 and extends generally vertically away from the base 150. The upright 152 may be, for example, pivotally coupled to the base 150, such that the upright 152 is configured to rotate with respect to the base 150 and/or the first screen vessel 104.

The crane 140 includes an arm 154 that extends perpendicular to the upright 152 and is connected thereto. As illustrated, the arm 154 may extend generally horizontally, parallel to the first screen vessel 104. The arm 154 may be pivotable along with the upright 152, relative to the first screen vessel 104. A counterbalance support 155 may extend from the base 150, and a foot 157 may extend downward therefrom and connected to a bracket 158 of the first screen vessel 104. The pivotable upright 152 may be lockable with respect to the base 150, e.g., using a pin and eyelet assembly, or the like.

Various support structures may be employed to provide cantilevered support for the pivotable arm 154. For example, one or more guy lines 156 (which may be solid bars, cables, etc.) may extend from the upright 152 toward a distal end 160 of the arm 154. Further, one or more braces 162 may extend from the upright 152 to the arm 154 in addition to or in lieu of the guy line 156. In some embodiments, the additional support structures for the arm 154 may be unnecessary and omitted.

The crane 140 may include one or more hoists (two shown: 164, 166). The hoists 164, 166 may be coupled to the arm 154 and may be configured to transmit a vertical load thereto. In some embodiments, the hoists 164, 166 may be movable along the arm 154, e.g., by sliding, or with rollers, etc. In other embodiments, the hoists 164, 166 may be generally prevented from such movement, but may, for example, by hung by hooks to eyelets connected to the arm 154.

The crane 140 may include one or more winches 170, which may be connected to the distal end 160 of the arm 154 via a winch support member 172. The winch support member 172 may be pivotal relative to the arm 154, such that the winch 170 may be brought into vertical alignment with the service closure 131 when the crane 140 is in a deployed position, as will be described below. In the illustrated stowed position, the distal end 160 may engage a block 178, which may be coupled to the first screen vessel 104 and may prevent the arm 154 from being pivoted past its stowed position. Further, in some embodiments, the arm 154 may optionally be supported vertically by releasable engagement with the block 178.

Figure 2:
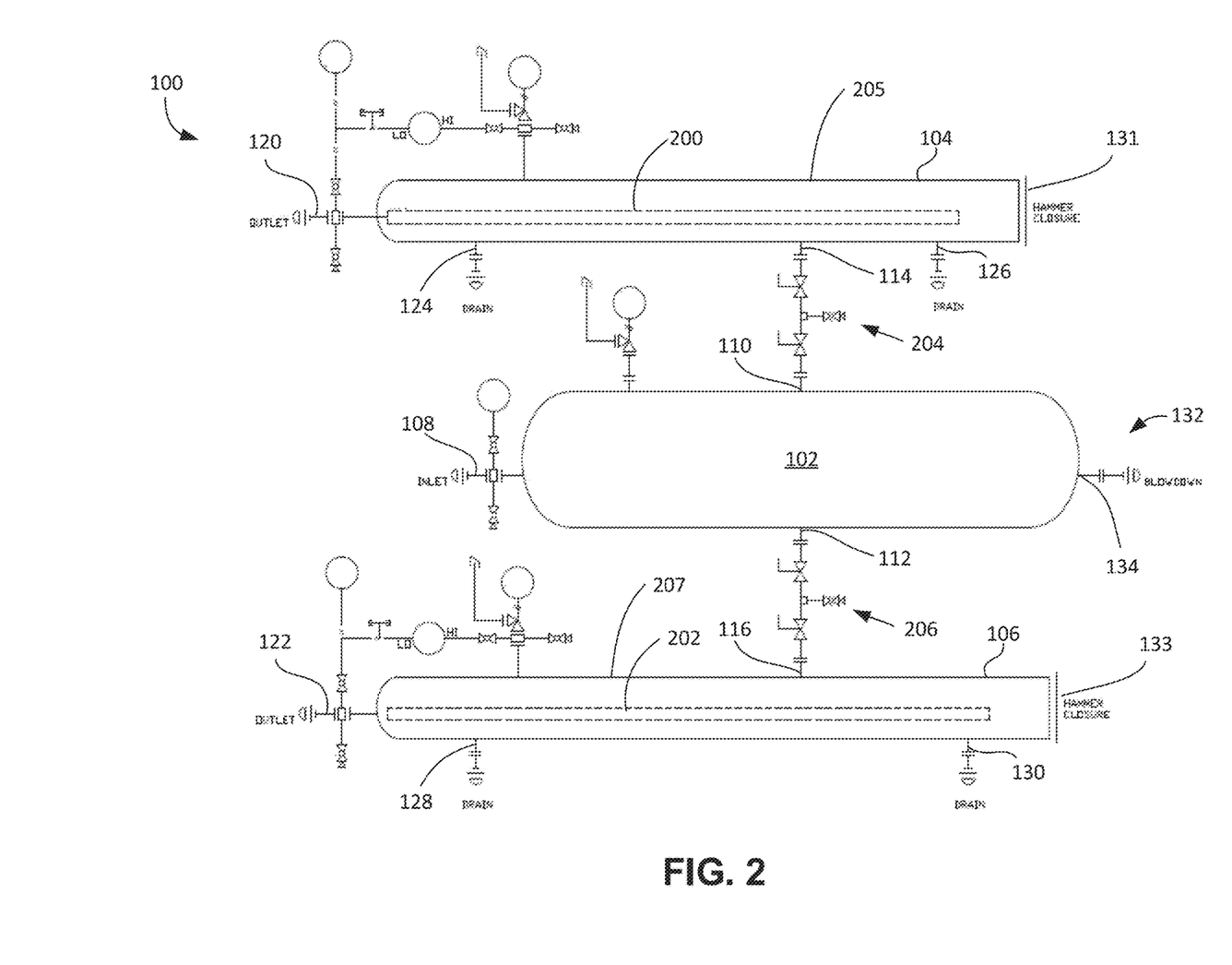
FIG. 2 illustrates a schematic view of the separator system, according to an embodiment.

FIG. 2 illustrates a schematic view of the system 100, according to an embodiment. As described above, the system 100 includes the lower vessel 102 and the first and second screen vessels 104, 106, which may be aligned in horizontal, parallel spatial orientation. Further, as mentioned above, the lower vessel 102 includes the mixed fluid inlet 108, through which a mixed fluid to be separated is received into the lower vessel 102.

Sand may be collected in the lower vessel 102 via inertial or gravity-based separation. The remaining fluid, which may still include solids suspended therein but at a reduced concentration by weight and/or volume, and may thus be referred to as a partially-separated fluid or flow, may be directed through the fluid outlets 110, 112 to the fluid inlets 114, 116 in the first and second screen vessels 104, 106. As such, when both screen vessels 104, 106 are operational, each may receive a portion of the partially-separated fluid from the lower vessel 102. Moreover, it will be appreciated that, in addition to being spatially oriented in parallel, the screen vessels 104, 106 may be operated in parallel, with fluid flowing from the lower vessel 102 and into both of the screen vessels 104, 106 at the same time, e.g., such that neither screen vessel 104, 106 is upstream of the other.

The screen vessels 104, 106 may each include a screen 200, 202, both of which are schematically depicted with dashed lines. The screens 200, 202 may be removably positioned within shells 205, 207, respectively. The shells 205, 207 may be generally cylindrical, hollow pressure vessels, through which the inlets 114, 116 and outlets 120, 122 extend. Fluid may flow through the screens 200, 202, while sand or other solids may be prevented from flowing therethrough, and may drop to the bottom of the shell 205, 207 or be entrained in the screen 200, 202. The fluid that flows through the screens 200, 202 may be directed to the outlets 120, 122 and out of the system 100.

As also shown, the first and second screen vessels 104, 106 may include the drains 124, 126, 128, 130 and service closures 131, 133, which may penetrate the corresponding shells 205, 207. The drains 124-130 may be employed for washing accumulated solids out of the vessels 104, 106, e.g., without opening the service closures 131, 133. The service closures 131, 133 may be opened to allow for removal of the screens 200, 202 from within the shells 205, 207, e.g., for cleaning. The lower vessel 102 may also be coupled to the blowdown assembly 132, which may include the blowdown drain 134, for receiving accumulated solids from within the lower vessel 102 during a blowdown cleaning, as described above.

Between the fluid outlets 110, 112 and the corresponding fluid inlets 114, 116, the system 100 may include one or more valve assemblies (two shown: 204, 206). In the illustrated embodiment, the two valve assemblies 204, 206 may be operable independently from one another. For example, the two valve assemblies 204, 206 may each be double block and bleed valve assemblies, but in other embodiments, could be other types of valve arrangements. The two valve assemblies 204, 206 may be positionable to allow fluid to flow therethrough, allowing for fluid to flow into neither, one, or both of the first and second screen vessels 104, 106 (i.e., controlling fluid flow to the first screen vessel 104 "independently" of flow to the second screen vessel 106 and vice versa). For example, during blowdown, the valve assemblies 204, 206 may both be closed. During maintenance of either of the first or second screen vessels 104, 106, the valve assembly 204, 206 corresponding thereto may be closed, to prevent fluid flow into the screen vessel 104, 106 that is being serviced. During normal operation, both of the valve assemblies 204, 206 may be open, such that the screen vessels 104, 106 operate in parallel, from a fluid flowpath perspective.

It will be appreciated that a single fluid outlet for the lower vessel 102 may be employed consistent with the above-described independent control of the fluid flow to the first and/or second screen vessels 104, 106. The line therefrom may be branched into two flowpaths, one leading to each of the two screen vessels 104, 106, e.g., using splitter and two valves, or a three-way valve assembly, etc. In such case, the dual outlets 110, 112 may be considered the two branches that lead to the respective first and second screen vessels 104, 106.

Figure 3:
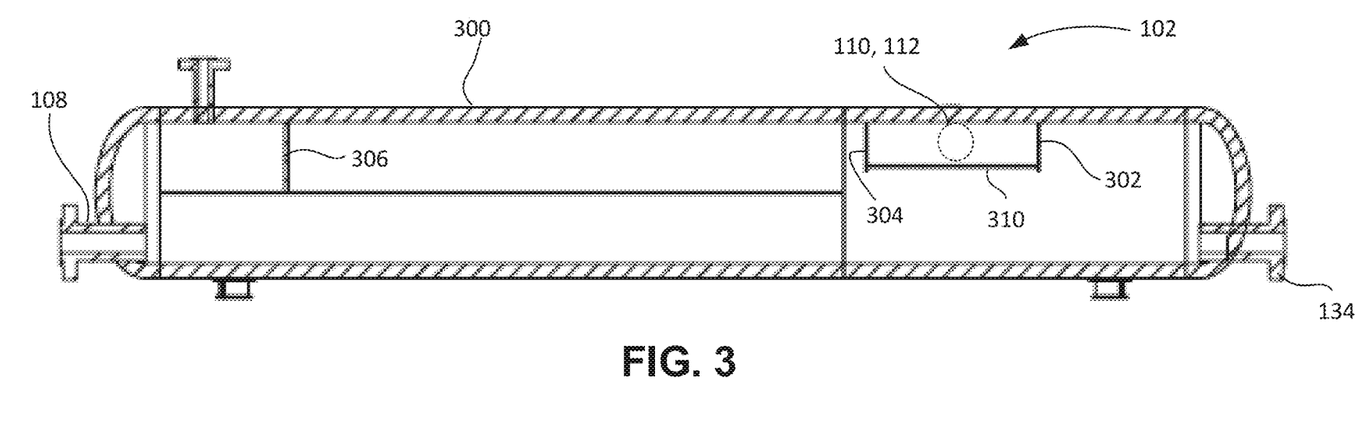
FIG. 3 illustrates a side, cross-sectional view of a lower vessel of the separator system, according to an embodiment.

FIG. 3 illustrates a side, cross-sectional view of the lower vessel 102, according to an embodiment. The vessel 102 may generally include the hollow shell 300, as shown, which may be generally cylindrical. The mixed fluid inlet 108 may introduce fluid through the shell 300 and into the interior of the vessel 102. Further, the vessel 102 may include one or more weir plates (three shown: 302, 304, 306). For example, two of the weir plates 302, 304 may serve as baffles to prevent undesired flow directly to the fluid outlets 110, 112 (shown in phantom in this cross-section). Another of the weir plates 306 may serve as a baffle for blocking direct fluid flow along the top of the shell 300, thereby increasing inertial separation in the vessel 102. The lower vessel 102 may also include one or more hydrate breaker plates 310 that provide perforations through which the fluid flows into the fluid outlets 110, 112.

Figure 4:
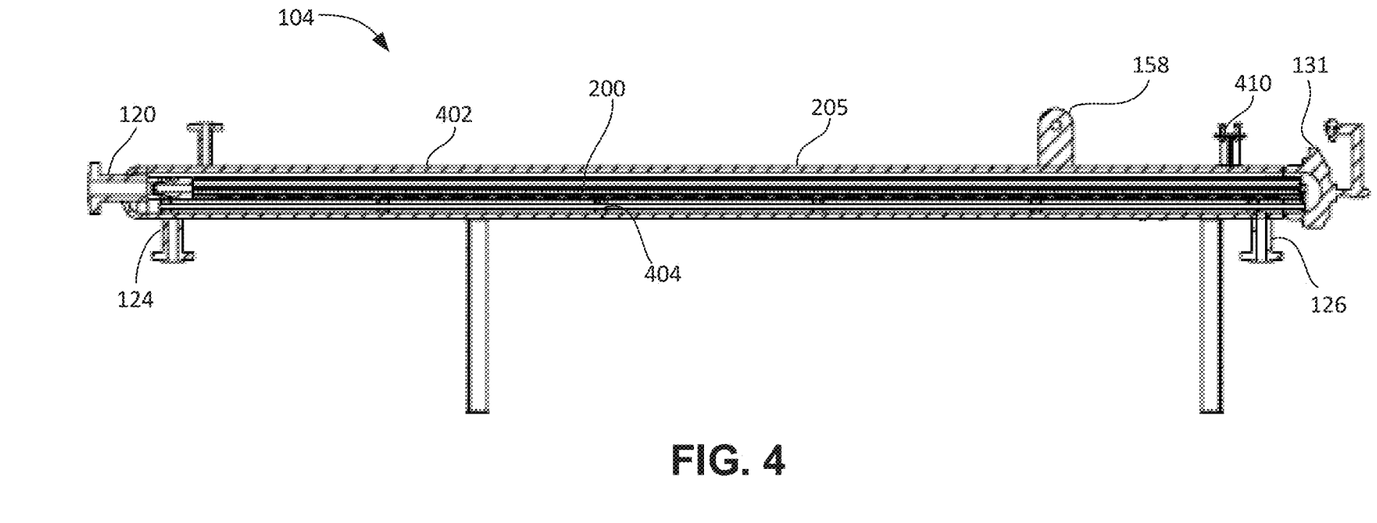
FIG. 4 illustrates a side, cross-sectional view of a screen vessel of the separator system, according to an embodiment.

FIG. 4 illustrates a side, cross-sectional view of the first screen vessel 104, according to an embodiment. The second screen vessel 106 may be similar in structure and function to the first screen vessel 104. The first screen vessel 104 may include the shell 205, as mentioned above with respect to FIG. 2. The shell 205 may be hollow and may thus define an inner surface 402. The screen 200 may be positioned within the shell 205 and may be supported by engagement with the inner surface 402 via a screen support assembly 404. In an embodiment, the screen 200 may be slidable relative to the shell 205, such that the screen 200 is removable longitudinally through the service closure The drains 124, 126 may be positioned on a lower portion of the vessel 104 and may penetrate the shell 205 to allow for selective evacuation of accumulated solids from the screen vessel 104, e.g., during a washout operation. The screen vessel 104 may also include the fluid outlet 120, which may communicate through the shell 205 to the interior of the screen 200, to receive fluid therefrom. The vessel 104 may also include one or more pressure safety valves 410 and various other connections (e.g., sensors) as desired for safety monitoring, maintenance, or any other reason. Further, as mentioned above, the vessel 104 may include the fluid inlet 114, which is not visible in this cross-sectional view. However, the fluid inlet 114 may extend through the shell 205, such that fluid is received from the lower vessel 102 (e.g., FIG. 1), through the fluid inlet 114, and into the shell 205 of the first screen vessel 104.

Figure 5:
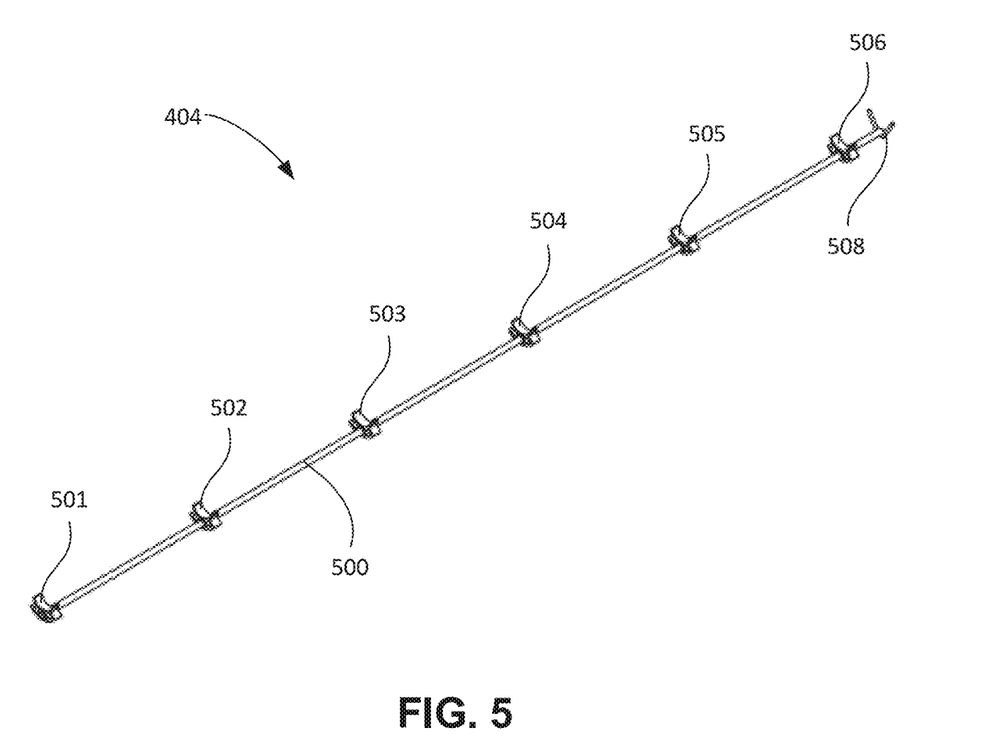
FIG. 5 illustrates a perspective view of a screen support assembly, according to an embodiment.

FIG. 5 illustrates a perspective view of the screen support assembly 404 for the screen 200, according to an embodiment. It will be appreciated that the screen 202 positioned in the second screen vessel 106 may be similar or the same. The screen support assembly 404 may include a rod 500, a plurality of saddle supports (six shown: 501-506), and a handle 508. The saddle supports 501-506 and the handle 508 may be coupled to the rod 500 and may be constrained to be generally stationary with respect thereto. The supports 501-506 may be positioned at intervals along the rod 500, and the handle 508 may be positioned at an end of the rod 500.

The rod 500 may be a single member or may be several smaller rods that are connected together, e.g., via the saddle supports 501-506. Further, the rod 500 may be cylindrical, or may be any other suitable shape. The rod 500 may be made from a generally rigid material suitable to maintain the orientation of the supports 501-506, as will be explained below, while also suitable for the environment within the first screen vessel 104. Examples of such materials may include metals such as stainless steel alloys, composite materials (e.g., carbon fiber reinforced materials), etc.

Figure 6:
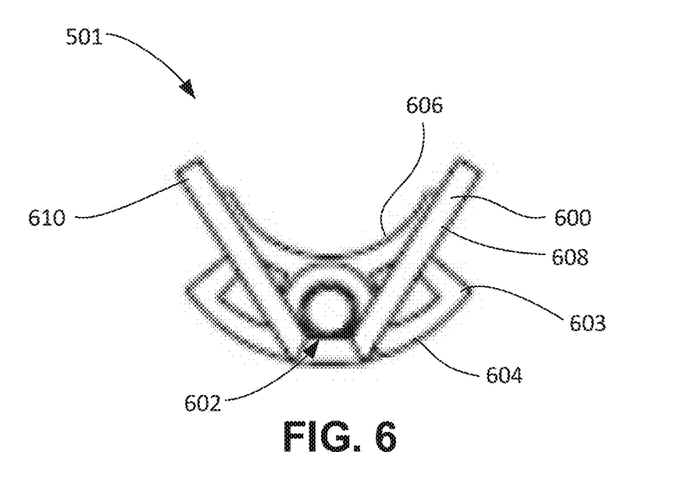
FIG. 6 illustrates a side view of a saddle support of the screen support assembly, according to an embodiment.

With continuing reference to FIG. 5, FIG. 6 illustrates a side view of one of the supports 501, with it being appreciated that the other supports 502-506 may be substantially the same. The support 501 may have a body 600 through which a bore 602 may be formed. The bore 602 may be sized to receive the rod 500, and may be secured thereto via nuts, plates, pins, set screws, adhesive, etc. The body 600 may also include a scraper 603, which may define a curved lower side 604, which may be configured to slide along the inner surface 402 of the shell 205 (FIG. 4) and may maximize surface area contact therebetween (e.g., the radius of curvature of the lower side 604 may substantially match the inner diameter of the shell 205 of the first screen vessel 104).

The body 600, e.g., the scraper 603, may be configured not only to transmit the weight of the screen 200 to the shell 205, but also to scrape out debris from the inner surface 402 of the shell 205 when the screen 200 is removed therefrom, as will be described below. To facilitate such sliding movement, the body 600, or at least a portion thereof, e.g., particularly the scraper 603, may be made from or coated with a low-friction material, such as TEFLON®.

The body 600 may also define a curved seat 606, which may receive the screen 200. The curved seat 606 may be secured to the screen 200, such that the screen 200 moves along with the support 501, but in other embodiments, the screen 200 may be slidable relative to the support 501. The body 600 may further include a pair of supports 608, 610 which may extend generally in a V-shape, on either side of the bore 602 and the curved seat 606, so as to provide rigidity to the support 501.

Figure 7A:
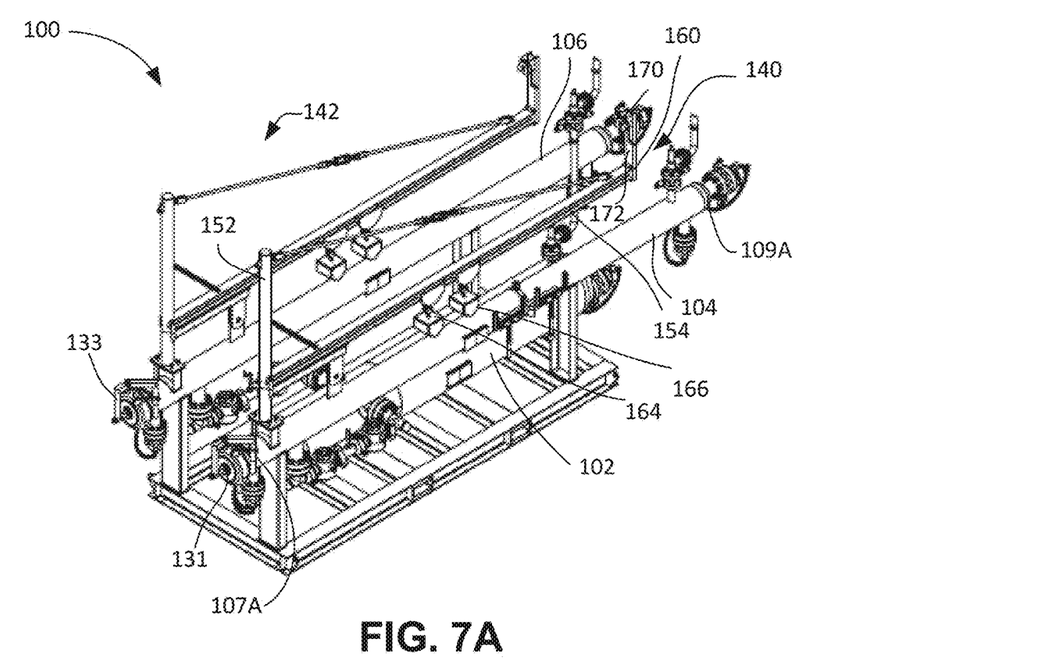
FIG. 7A illustrates a perspective view of the separator system having a crane in a stowed configuration, according to an embodiment.
Figure 7B:
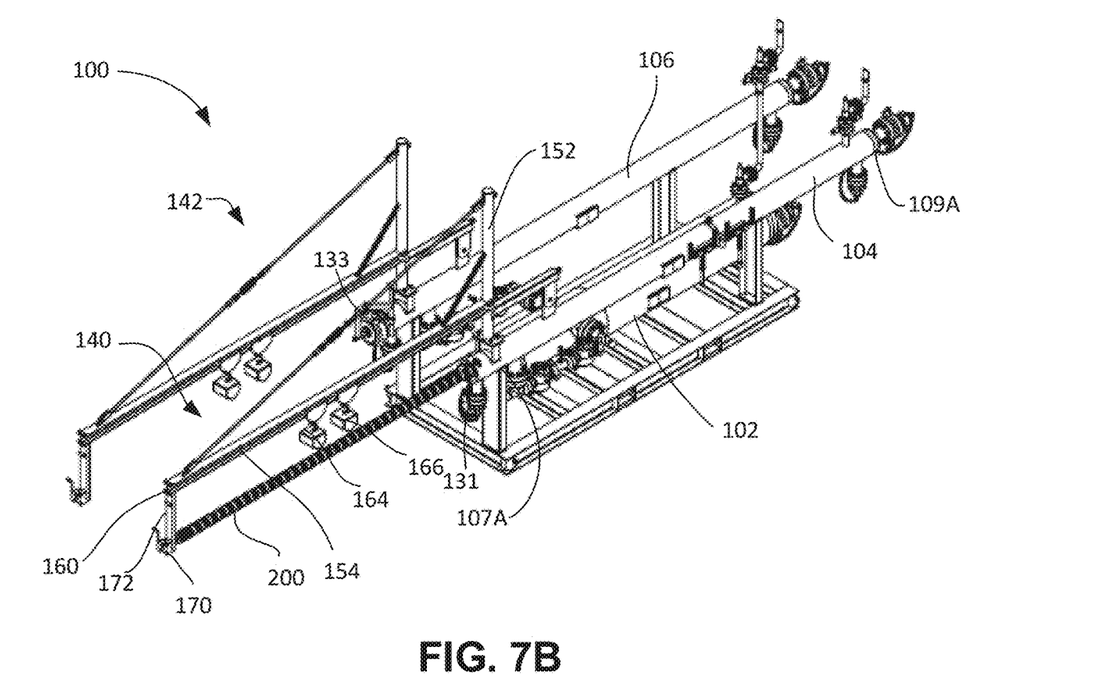
FIG. 7B illustrates a perspective view of the separator system having the crane in a deployed configuration and one screen partially removed from within one of the screen vessels, according to an embodiment.

FIGS. 7A and 7B illustrate perspective views of the system 100 with the first and second screen vessels 104, 106 in an operational configuration, and with the first screen vessel 104 opened and the screen 200 partially removed therefrom for maintenance, respectively, according to an embodiment. To move from the configurations of FIG. 7A to that of FIG. 7B, the fluid flow from the lower vessel 102 is stopped to the first screen vessel 104. Accordingly, rather than taking both screen vessels 104, 106 offline at the same time, flow to one of the screen vessels 104, 106 may be maintained, while flow to the other is stopped, thereby allowing the system 100 to continue operation (potentially at lower flowrates through the system 100). It will be appreciated that maintenance of the screen 202 of the second screen vessel 106 may proceed in much the same way as will now be described for the screen 200.

The cranes 140, 142 may be moved separately or as a single unit regardless of whether one or both of the screens 200, 200 is to be serviced. Accordingly, as shown, both cranes 140, 142 may be unlocked and pivoted from their stowed position (FIG. 7A) to their deployed position (FIG. 7B). The deployment of the crane 140 will hereinafter be described, with such operation being an example of operation of the crane 142 and its corresponding components. In the stowed position, the arm 154 of the crane 140 may extend from the upright 152 and toward the end 109A, such that the distal end 160 arm 154 is proximal to the end 109A of the first screen vessel 104 in some embodiments. In the deployed position, the arm 154 may extend from the end 107A, away from the end 109A. After pivoting the arm 154, the winch support member 172 may be pivoted, slid, or otherwise moved downward, such that the winch 170 is aligned with the service closure 131.

The service closure 131 may then be opened to expose the interior of the first screen vessel 104. The winch 170 may be connected to the handles 508 of the screen support assembly 404, or the winch 170 may instead or additionally be connected to the screen 200 itself. The winch 170 may then be actuated to draw the screen 200 out of the end 109A, through the opened service closure 131. During such sliding of the screen 200, the hoists 164, 166 may be connected to the screen 200 to support the middle portion of the screen 200 from buckling. With the screen 200 extended out of the first screen vessel 104, the screen 200 may be cleaned by an operator, removing any entrained solids. The screen 200 may then be pushed, e.g., manually or via another device such as a winch (not shown), back into the first screen vessel 104, the service closure 131 may be closed, making the first screen vessel 104 ready for resumed fluid flow from the lower vessel 102. During such reinsertion of the screen 200, the crane 140 (and 142, if deployed) may be returned and locked into its stowed position (FIG. 7A).

Figure 8:
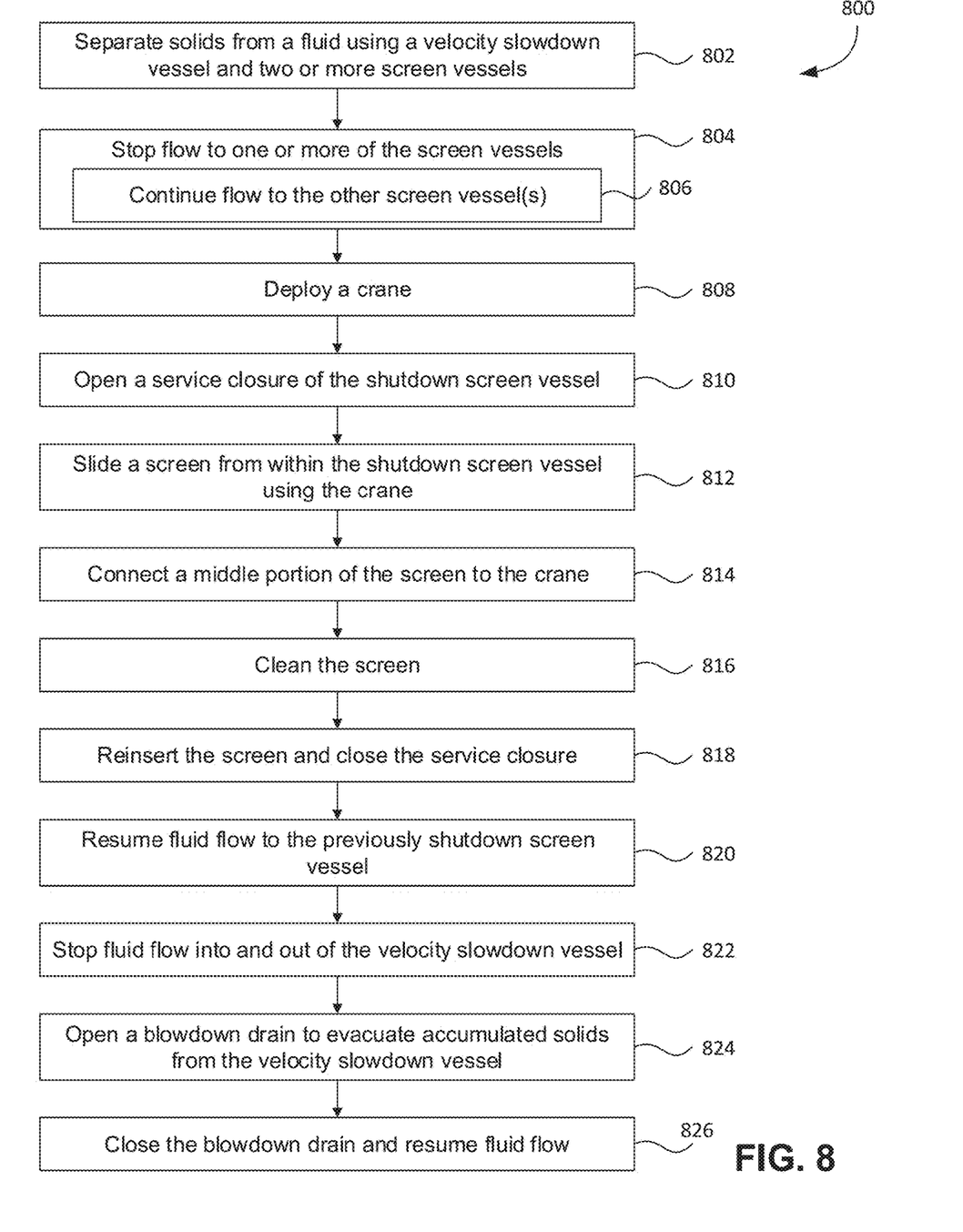
FIG. 8 illustrates a flowchart of a method for operating a separator system, according to an embodiment.

FIG. 8 illustrates a flowchart of a method 800 for operating a separator system, according to an embodiment. Some embodiments of the method 800 may be executed by operation of an embodiment of the separator system 100 described above, but other embodiments may employ other types of separator systems, and thus the method 800 is not limited to any particular structure unless otherwise specified herein.

The method 800 may begin with the separator system 100 operating "normally," that is, with fluid flowing through the lower vessel 102 and two or more screen vessels (e.g., the first screen vessel 104 and the second screen vessel 106, as described above), as at 802. The screen vessels 104, 106 may be operating in parallel, receiving the fluid flow from the lower vessel 102, and then providing the fluid to be recombined downstream from the screen vessels 104, 106, such that fluid proceeds through one screen vessel 104, 106 or the other, but not both. In some embodiments, multiple vessels in parallel or in series may be provided, without limitation.

At some point, it may be desired to take one or more of the screen vessels 104, 106 offline, e.g., to clean the screen thereof. Accordingly, the method 800 may include stopping flow to one of the screen vessels 104, 106, as at 804. The screen vessel 104, 106 that is shutdown could be either of the screen vessels 104, 106, but will be described for convenience as the "shutdown" screen vessel 104. Stopping (or "shutting down") flow may be effected by closing the valve assembly 204 (FIG. 2). As indicated at 806, fluid may continue to flow from the lower vessel 102 to the screen vessel 106 that is not shutdown, e.g., by keeping the valve assembly 206 open. Thus, the separator system 100 may continue to operate with one screen vessel 104 being shutdown, using the other screen vessel 106.

The method 800 may then include deploying the crane 140, as at 808. The crane 140 may be connected to the shutdown screen vessel 104. To deploy the crane 140, the arm 154 may be pivoted such that it extends outward from the end 107A of the shutdown screen vessel 104. The winch support member 172 may then be pivoted downwards, thereby aligning the winch 170 with the screen 200.

The method 800 may then proceed to opening the service closure 131 of the shutdown screen vessel 104, as at 810. This may expose the interior of the shutdown screen vessel 104, where the screen 200 may reside. The screen 200 may thus be slid from within the shutdown screen vessel 104 using the crane 140, as at 812, e.g., by actuating the winch 170.

During or after sliding the screen 200, the screen 200 may be attached to one or more hoists 164, 166 of the crane 140, as at 814, to support the screen 200 against buckling. Further, during the sliding, the screen support assembly 404 (FIG. 4) may slide along with the screen 200. When the screen support assembly 404 slides, the supports 501-506 (FIG. 5) may push accumulated debris out of the shutdown screen vessel 104. As the screen 200 is removed, or after removing the screen 200, the screen 200 may be cleaned of any entrained solids, debris, etc., as at 816. Once cleaned (or potentially during cleaning), the screen 200 may be reinserted and the service closure 131 closed, as at 818. Fluid flow to the shutdown screen vessel 104 may then resume, as at 820, e.g., by opening the valve assembly 204.

This sequence may be repeated for any of the other screen assemblies, such that, for example, one of the screen vessels remains online, allowing the system 100 to continue operation. In some embodiments, however, all of the screen vessels 104, 106 may be taken offline together and the system 100 operation stopped.

In some embodiments, it may be desired to remove accumulated solids from within the lower vessel 102. Accordingly, the method 800 may also include stopping fluid flow into and out of the lower vessel 102, as at 822. The fluid in the lower vessel 102 may have a raised pressure.

The method 800 may include opening a blowdown drain 134 to evacuate accumulated solids from within the lower vessel 102, as at 824. The high pressure fluid within the lower vessel 102 may forcefully eject such solids through the blowdown drain 134 in a slurry. The slurry may then be directed to a storage vessel for later collection and removal. The method 800 may then include closing the blowdown drain 134 and resuming fluid flow through the lower vessel 102, as at 826.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A separating system, comprising:
   a slowdown chamber vessel comprising an inlet for receiving a mixed fluid comprising a solid and a liquid, wherein the slowdown chamber vessel separates at least some of the solid from the liquid so as to produce a partially-separated fluid;
   a first screen vessel fluidly coupled to the slowdown chamber via one or more fluid connections, the first screen vessel for receiving at least a first portion of the partially-separated fluid, the first screen vessel comprising a first shell, and a first screen that is positioned within the first shell and at least partially removable therefrom;
   a second screen vessel spatially oriented parallel to the first screen vessel and fluidly coupled to the slowdown chamber vessel via one or more fluid connections, the second screen vessel for receiving at least a second portion of the partially-separated fluid, the second screen vessel comprising a second shell and a second screen that is positioned within the second shell and is at least partially removable therefrom;
   a first valve fluidly coupled to the slowdown chamber vessel and the first screen vessel, the first valve for preventing the first portion of the partially-separated fluid from flowing from the slowdown chamber vessel into the first screen vessel to allow the first screen to be cleaned without taking the separating system offline;
   a second valve fluidly coupled to the slowdown chamber vessel and the second screen vessel, the second valve for preventing the second portion of the partially-separated fluid from flowing from the slowdown chamber vessel into the second screen vessel to allow the second screen to be cleaned without taking the separating system offline; and
   a screen support assembly comprising a rod and a plurality of saddle-shaped supports that are coupled to the rod, the rod and the saddle-shaped supports being slidably positioned within the first shell and coupled to the first screen.

2. The system of claim 1, wherein the first screen is not downstream from the second screen and the second screen is not downstream from the first screen.

3. The system of claim 1, wherein the slowdown chamber vessel is spatially oriented parallel to the first screen vessel and the second screen vessel.

4. The system of claim 3, wherein the slowdown chamber vessel, the first screen vessel, and the second screen vessel are spatially oriented generally horizontally.

5. The system of claim 1, further comprising a first crane coupled to the first screen vessel for at least partially supporting the first screen when the first screen is removed from the first shell.

6. The system of claim 5, wherein the first crane comprises:
   one or more winches for pulling the first screen in a horizontal direction through a service closure of the first screen vessel; and
   one or more hoists for supporting the first screen as the first screen is removed from within the first shell.

7. The system of claim 5, further comprising a second crane coupled to the second screen vessel for at least partially removing the second screen from within the second shell.

8. The system of claim 5, wherein the first crane is pivotably coupled to the first screen vessel, wherein an arm of the first crane is positioned above the first screen vessel when the first crane is in a stowed position, wherein the arm of the first crane is positioned extend past an end of the first screen vessel in a deployed position, and wherein the arm is connectable to the first screen in the deployed position.

9. The system of claim 1, wherein the rod and the supports slide along an interior diameter surface of the first shell when the first screen is moved relative to the first screen vessel.

10. The system of claim 1, further comprising a blowdown assembly coupled to the slowdown chamber vessel at a second end that is opposite to a first end of the slowdown chamber vessel, the inlet of the slowdown chamber vessel being at the first end.

11. The separating system of claim 1, wherein the slowdown chamber vessel is positioned vertically lower than the first and second screen vessels.

12. The system of claim 1, wherein the saddle-shaped supports are axially offset from one another along the rod.

13. The system of claim 1, further comprising a winch, wherein the screen support assembly further comprises a handle positioned proximate to an end of the rod, and wherein the winch is coupled to the handle and to draw the first screen in the horizontal direction out of the end of the first screen vessel.

14. A separating system, comprising:
    a slowdown chamber vessel for receiving a mixed flow comprising a solid and a liquid and to separate at least some of the solid from the liquid so as to produce a partially-separated fluid;
    a first screen vessel coupled to the slowdown chamber vessel for receiving at least a first portion of the partially-separated fluid therefrom, the first screen vessel comprising a first shell;
    a first screen removably positioned within the first screen vessel, such that the first portion of the partially-separated fluid introduced into the first screen vessel flows through the first screen;
    a second screen vessel coupled to the slowdown chamber vessel for receiving at least a second portion of the partially-separated fluid therefrom, wherein the first and second screen vessels and the slowdown chamber vessel are each oriented horizontally with respect to the ground and in parallel to one another;

a second screen removably positioned within the second screen vessel, such that that the second portion of the partially-separated fluid introduced into the second screen vessel flows through the second screen;

a first valve fluidly coupled to the slowdown chamber vessel and the first screen vessel, the first valve for preventing the first portion of the partially-separated fluid from flowing from the slowdown chamber vessel into the first screen vessel to allow the first screen to be cleaned without taking the separating system offline;

a second valve fluidly coupled to the slowdown chamber vessel and the second screen vessel, the second valve for preventing the second portion of the partially-separated fluid from flowing from the slowdown chamber vessel into the second screen vessel to allow the second screen to be cleaned without taking the separating system offline; and a screen support assembly comprising a rod and a plurality of saddle-shaped supports that are coupled to the rod, the rod and the saddle-shaped supports being slidably positioned within the first shell and coupled to the first screen.

15. The system of claim 14, further comprising a blowdown drain coupled to the slowdown chamber vessel, wherein the valve assembly stops fluid flow into and out of the slowdown chamber vessel, wherein the blowdown drain opens to allow evacuation of accumulated solids from the slowdown chamber vessel after the valve assembly stops fluid flow into and out of the slowdown chamber vessel.

16. The system of claim 15, wherein the first screen vessel comprises a service closure at a first end thereof, the first screen being removable from within the first screen vessel though the service closure.

17. The system of claim 16, further comprising a crane pivotally coupled to the first screen vessel, the crane comprising:
an upright pivotally coupled to the first screen vessel;
an arm coupled to the upright; and
a winch coupled to the arm,
wherein the crane is pivotal with respect to the first screen vessel from a stowed position in which the arm extends from the upright toward a second end of the first screen vessel, to a deployed position in which the arm extends from the upright, away from the second end, and
wherein the winch is connected to the first screen or a support assembly for the first screen, to slide the first screen at least partially out of the first screen vessel through the service closure.

18. A separating system, comprising:
a slowdown chamber vessel comprising an inlet to receive a mixed fluid comprising a solid and a liquid, wherein the slowdown chamber vessel separates at least some of the solid from the liquid so as to produce a partially-separated fluid, and an outlet that receives the partially-separated fluid;

a first screen vessel coupled to the slowdown chamber vessel such that the first screen vessel receives a first portion of the partially-separated fluid from the outlet of the slowdown chamber vessel, the first screen vessel comprising a first shell, and a first screen that is positioned within the first shell and at least partially removable therefrom;

a second screen vessel spatially oriented parallel to the first screen vessel and coupled to the slowdown chamber vessel such that the second screen vessel receives a second portion of the partially-separated fluid from the outlet of the slowdown chamber vessel, the second screen vessel comprising a second shell and a second screen that is positioned within the second shell and is at least partially removable therefrom;

a first valve fluidly coupled to the slowdown chamber vessel and the first screen vessel, the first valve for preventing the first portion of the partially-separated fluid from flowing from the slowdown chamber vessel into the first screen vessel to allow the first screen to be cleaned without taking the separating system offline;

a second valve fluidly coupled to the slowdown chamber vessel and the second screen vessel, the second valve for preventing the second portion of the partially-separated fluid from flowing from the slowdown chamber vessel into the second screen vessel to allow the second screen to be cleaned without taking the separating system offline, wherein the first screen vessel is not downstream from the second screen vessel, and wherein the second screen vessel is not downstream from the first screen vessel;

a screen support assembly comprising a rod and a plurality of saddle-shaped supports that are coupled to the rod, the rod and the saddle-shaped supports being slidably positioned within the first shell and coupled to the first screen, wherein the rod and the saddle-shaped supports slide along an interior diameter surface of the first shell when the first screen is moved relative to the first screen vessel, and wherein the saddle-shaped supports each comprise a body defining a curved side having a radius of curvature that matches the interior diameter surface of the first shell, so as to scrape out debris from the interior diameter surface of the first shell when the first screen is removed therefrom; and a first crane pivotably coupled to the first screen vessel, the first crane comprising:
an arm positioned above the first screen vessel when the first crane is in a stowed position, wherein the arm of the first crane extends past an end of the first screen vessel in a deployed position, and wherein the arm is connectable to the first screen in the deployed position; and
a winch coupled to the arm, wherein the winch draws the first screen in a horizontal direction out of the end of the first screen vessel.

19. The separating system of claim 18, further comprising a second crane pivotably coupled to the second screen vessel, the second crane comprising:
an arm positioned above the second screen vessel when the second crane is in a stowed position, wherein the arm of the second crane extends past an end of the second screen vessel in a deployed position, and wherein the arm is connectable to the second screen in the deployed position; and
a winch coupled to the arm of the second crane, wherein the winch draws the second screen in a horizontal direction out of the end of the second screen vessel.

20. The separating system of claim 18, wherein the rod and the saddle-shaped supports slide along an interior diameter surface of the first shell when the first screen is moved relative to the first screen vessel, and wherein the saddle-shaped supports each comprise a body defining a curved side having a radius of curvature that matches the interior diameter surface of the first shell, so as to scrape out debris from the interior diameter surface of the first shell when the first screen is removed therefrom.

21. The system of claim 20, wherein the body defines:
a bore that receives the rod; and
a curved seat above the bore that receives the first screen.

22. The system of claim 21, wherein the body further first and second supports that are arranged in V-shape and positioned on opposite horizontal sides of the bore and the curved seat to provide rigidity to the saddle-shaped support.

\* \* \* \* \*